United States Patent [19]

Thompson

[11] 4,364,588
[45] Dec. 21, 1982

[54] BAND SEAL CLAMP

[75] Inventor: Steven R. Thompson, Moore, Okla.

[73] Assignee: Garlock, Inc., Longview, Tex.

[21] Appl. No.: 205,639

[22] Filed: Nov. 10, 1980

[51] Int. Cl.³ .............................................. F16L 21/06
[52] U.S. Cl. ....................................... 285/419; 285/4; 138/99
[58] Field of Search ............... 285/419, 420, 373, 382; 138/99

[56] References Cited

U.S. PATENT DOCUMENTS

| 494,996 | 4/1893 | Dwelle . | |
|---|---|---|---|
| 2,227,551 | 1/1941 | Morris . | |
| 3,905,623 | 9/1975 | Cassel | 285/382 |
| 4,056,273 | 11/1977 | Cassel | 285/382 X |
| 4,142,743 | 3/1979 | McGowen et al. | 285/373 X |
| 4,165,109 | 8/1979 | Foti | 285/382 X |
| 4,261,600 | 4/1981 | Cassel | 285/420 X |

FOREIGN PATENT DOCUMENTS

| 19293 | 3/1956 | Fed. Rep. of Germany | 285/419 |
|---|---|---|---|
| 705247 | 3/1954 | United Kingdom . | |
| WO80/02317 | 10/1980 | PCT Int'l. Appl. | 285/420 |

Primary Examiner—Thomas F. Callaghan
Attorney, Agent, or Firm—Woodcock, Washburn, Kurtz, Mackiewicz & Norris

[57] ABSTRACT

An improved band seal clamp for clamping of tubular members is disclosed which features a band-like clamping member having slots formed in its ends for interaction with bolts held rigidly in holes formed in a spacing member disposed between the ends of the clamp. The ends of the band are shaped to define surfaces at an angle with respect to the surface of the tubular members which coact with force bars having corresponding shapes. Throughbolts fit through the slots in the band, holes in the force bars and the holes in the spacing member, so that upon tightening of the bolts the ends of the band clamp are forced outward, thus exerting a compressive stress on the tubular member.

15 Claims, 7 Drawing Figures

BAND SEAL CLAMP

FIELD OF THE INVENTION

This application relates generally to the field of clamps for clamping of tubular sections. More particularly, the invention relates to a band seal clamp wherein a generally cylindrical straplike band is clamped around two portions of pipe of generally circular cross-section, which may be either butted against one another or be sized so that one fits within the other. Upon tightening of the clamp a rigid and mechanically strong connection is formed which exerts a radially inward, substantially uniform force completely around the circumference of the tubes.

BACKGROUND OF THE INVENTION

The prior art is replete with various attempts at solving the problem of clamping two generally cylindrical members, for example tubes or pipes, together. The problem is to provide a clamp which exerts a radially inward force uniformly around the entire circumference of the tubes to be fastened together. While it is relatively straightforward to exert the force over the greater portion of the circumference of the tubes, it is important if a mechanically strong and leak-free connection is to be formed that the force be exerted over the entire circumference of the pipe. To this end, numerous attempts have been made in the prior art to provide rigid pipe couplings; see, for example, U.S. Pat. No. 494,996 to Dwelle in which rigid hinged members are clamped together to grip the pipe. See also U.S. Pat. No. 2,227,551 to Morris which shows clamps having interlocking fingers to be clamped together to exert the force over the entire circumference of the tube. Later patentees realized that it would be preferable to use a somewhat flexible band which would be slightly deformed to more closely match the contours of the pipe to be clamped, thus being more likely to exert the force uniformly around the entire circumference of the pipe. Into this class fall the U.S. Pat. Nos. to Cassel et al 4,056,273 and 3,905,623, as well as that to Foti 4,165,109. All these show provision of clamps which use a plurality of bolts connecting two ends of a band wrapped around a pair of pipes to be joined and having a connection piece interposed therebetween. Typically, the connection piece is formed with an axially extending recess formed between the bolt holes on both its sides so that upon tightening of the bolts the ends of the band will be deformed to fit more closely together within the recesses; force bars may be used to spread the force exerted by the bolts uniformly across the width of the clamp. In some cases, particularly U.S. Pat. No. 4,056,273 to Cassel, the shaping member may also be shaped to coact with the outer circumference of the tube so as to exert a radially inward force thereon by being pulled into the surface of the pipe by the tightening of the bolt(s) simultaneously with deformation of the ends of the band. However, the fact that this deformation is required means that the force exerted upon tightening the bolts is at least partially directed towards this deformation and is not useful in achieving the primary object of the clamp, that is, to exert a generally radially inward force substantially uniformly around the circumference of the tube.

OBJECTS OF THE INVENTION

As will be discussed in further detail below, the present invention is directed at solving this need of the art in that it has as its primary objective the provision of an improved band seal clamp for the clamping of tubes together.

It is a further object of the invention to provide an improved band seal clamp wherein a substantially uniform clamping force is exerted radially inwardly about substantially the entire circumference of the tube.

Still a further object of the invention is to provide a band seal clamp for exerting a clamping force uniformly around the circumference around a tube in which substantial deformation of the ends of the band is avoided upon tightening of the clamp.

Still another object of the invention is to provide a band seal clamp which can be readily assembled in a "band-aid" mode, that is, without disassembly of pairs of tubes to be clamped; instead, the clamp can be slipped around the tubes without their disassembly or without requiring free access from the joint to be clamped to one end of the tube.

SUMMARY OF THE INVENTION

The above needs of the art and objects of the invention are satisfied by the clamp according to the invention which comprises a band seal clamp having slots formed in the ends of the bands to coact with holes formed in a shaping and spacing member interposed between the ends of the band upon assembly and with holes in force bars. Bolts are passed therethrough so that upon tightening of the bolts tension is effected between the ends of the clamp around the tube, so that the band tends to be pulled tightly around the tube. The shape of the shaping member and of the force bars interacting therewith is such that the band is tightened by its ends moving outwardly radially with respect to the tubes to be clamped; the holes in the end of the band are formed slot-wise so as to permit this movement, while the positions of the bolts are fixed by the spacing member.

BRIEF DESCRIPTION OF THE DRAWINGS

The invention will be better understood if reference is made to the accompanying drawings, in which.

DESCRIPTION OF THE PREFERRED EMBODIMENTS

Figure 1:
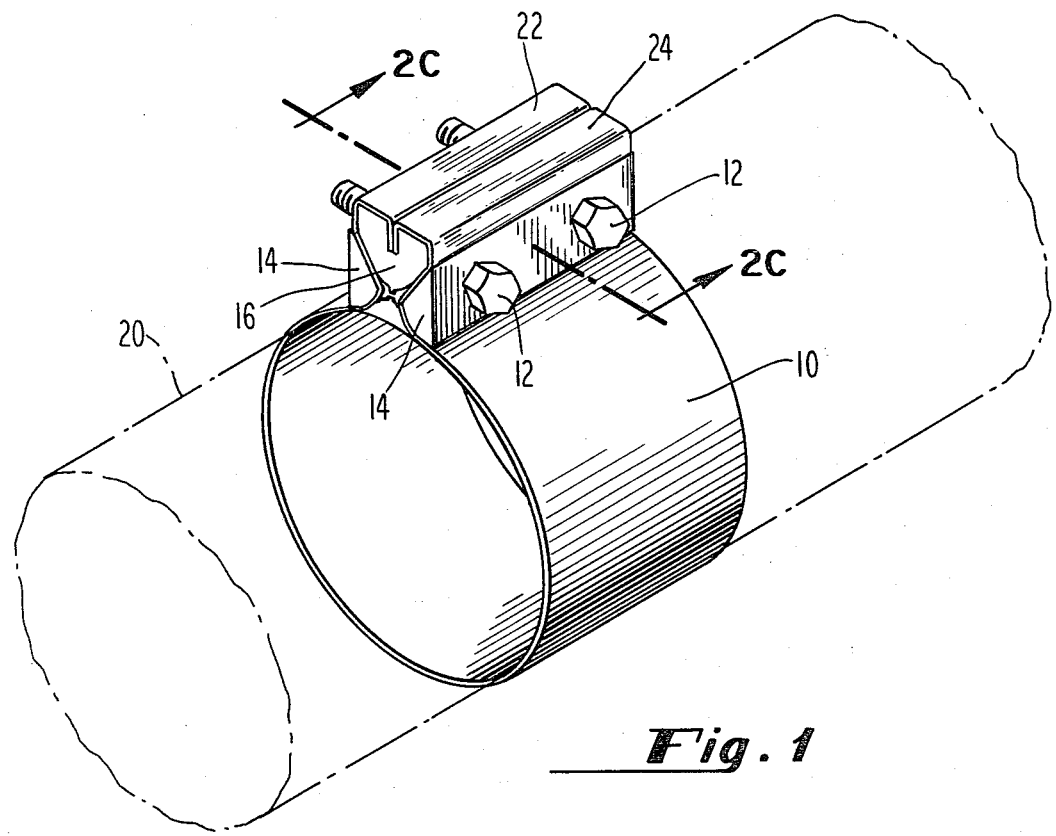
FIG. 1 represents an overall perspective view of a complete connector according to the invention.

As described above, this invention relates to the provision of a band seal clamp for clamping two tubes together. A completed assembly of such a clamp according to the invention is depicted generally in FIG. 1 clamping two tubes shown in phantom. The two tubes may be butted together or one may slide within the other. In either case, the objective of the clamp is to exert a substantially uniform compressional force directed radially inwardly on the tubes. This is done by tightening two bolts 12 which cause the band 10 to tighten generally upon the tubes. The bolts 12 operating in concert with shaped members or force bars 14 cause the overall circumference of the band 10 which is in contact with the tubes to decrease, thus exerting a compressional force on the tube. This movement is effected by the relative shaping of the force bars 14 with respect to a central shaping member 16 in a manner which will be discussed more fully below.

Figures 2A, 2B, 2C:
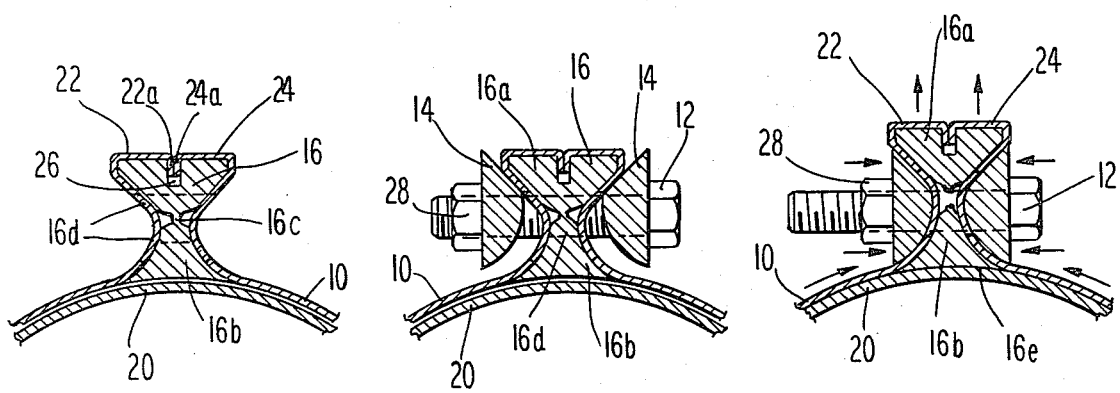
FIGS. 2a–2c represent cross-sectional views of successive stages in the clamping of a tube by the coupling of the invention, taken along the line 2c–2c of FIG. 1.

Referring now to FIGS. 2a through 2c, the sequence of operations leading to clamping of the tubes by the clamp of the invention is shown. In FIG. 2a, a portion of a tube 20 and a section of the band seal clamp 10 of the invention are shown. As will be apparent, the first step in assembly of the clamp is to bring the two ends 22 and 24 of the band together. These ends have downturned portions 22a and 24a respectively which fit within a groove 26 formed within the central shaping and spacing member 16. They are retained there by the "spring" of the band, typically formed of formable steel. As noted, the central shaping and spacing member 16 comprises an upper portion 16a and a lower portion 16b which are connected by a thin tongue of material 16c; for one or more holes indicated by dotted lines at 16d are formed in the spacing member 16 for insertion of through bolts 12 (FIG. 2b). These holes 16d are shaped to fit bolts 12 relatively closely, as compared with the corresponding holes formed in the band 10 which are instead slotted, to permit movement of the band 10 with respect to the bolts for reasons which will be discussed below.

Referring now to FIG. 2b, the bolts 12 are shown assembled together with the force bars 14 disposed on either side of the shaping member 16. A nut 28 is used on the opposite side of the bolt 12 from its head; however, it will be understood that one of the force bars 14 could be threaded, although this would then mean that they could not be identical. Similarly, the force bars could be individually fitted to the bolts. They could be circular in outline, or elongated as shown. Whatever, the shape of these force transmitting members, the bolt holes must fit the bolts well enough that the reaction surfaces cannot be rotated out of contact with the band 10. The force bars 14 are formed to comprise a generally semi-circular cross-section which may have a substantially flat face shaped to interact with recesses formed in the cross-sectional outline of either side of the central shaping and spacing member 16 and with the band 10 fitting therewithin. As shown in FIG. 2b, the initial hole 16d formed for the insertion of the bolt 12 in the shaping and spacing member 16 is positioned so as that upon assembly of the force bars 14 their semi-circular outline shape does not fit within the semi-circular recesses in the shaping member 16, but instead is disposed some distance outwardly along a radial line with respect to the tube 20. The bolts are thus fixedly spaced outwardly from the tube 20 by the shaping member 16. Therefore, upon tightening of the nut 28 with respect to the bolt 12 an unbalanced force will be exerted on the band 10 by the force bars; since the hole 16d in the shaping member 16 fits the bolt 12 closely as explained above, the resultant force exerted tends to separate the upper portion of the shaping member 16a from the lower portion 16b. Since the ends 22 and 24 of the band are held by the shaping and spacing member 16, the upward movement of the upper portion 16a with respect to the lower portion 16b of the shaping member tends to tighten the band 10 on the tube 20. Eventually the tongue 16c breaks, which permits further uplifting of the ends of the band; concomitantly, of course, the band is tightened by the relative outward movement of the rigidly fixed end sections indicated generally at 22 and 24. A shaping member having such a frangible tongue could be made by a process such as extrusion, or perhaps by molding. Powder metallurgy techniques might also be employed.

As shown in FIG. 2c the net effect of tightening the bolts is to move the upper portion 16a of the shaping member 16 outwardly with respect to the lower portion 16b; as the ends of the band 22 and 24 are attached to the outer portion 16a, the band 10 is tightened about the tube 20 upon tightening of the nut 28 with respect to the bolt 12.

It will be appreciated by those skilled in the art that this method of tightening the band provides a relatively limited range of adjustment, which means merely that a given band seal clamp will only be useful to clamp tubes of a relatively limited range of sizes. Since, however, tubing is manufactured only to specific and well-known sizes, this poses no difficulty but instead provides the advantage of allowing the underside of the lower portion of the shaping member 16 to be curved as at 16e so as to fit the tube 20 very closely. In this way the net force exerted on the tube is relatively uniform around its circumference, being merely a function of the total force exerted by tightening the nuts 28 on the bolts 12 divided by the area of the band 10 combined with that of the curved surface 16e. By making the width of the band equal to the length of the shaping member, the force exerted will be uniform all the way around the circumference of the clamp.

Figure 3A:
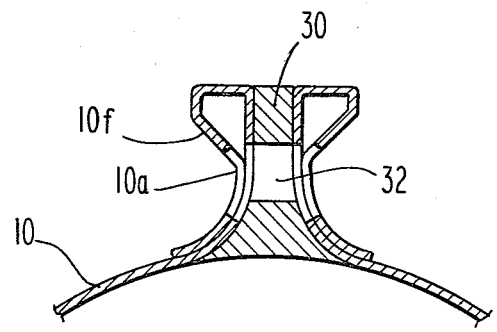
FIGS. 3a–3c represent comparable cross-sections of a second embodiment of the invention shown at various stages of assembly.
Figure 3B:
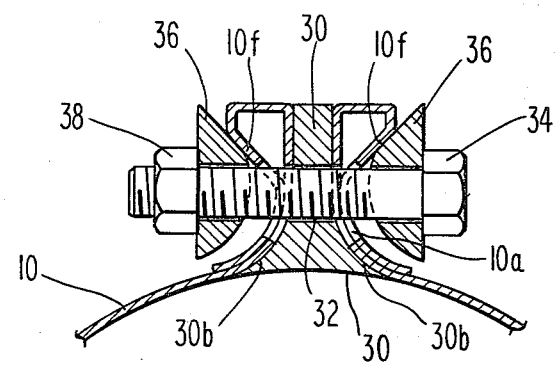
Figure 3C:
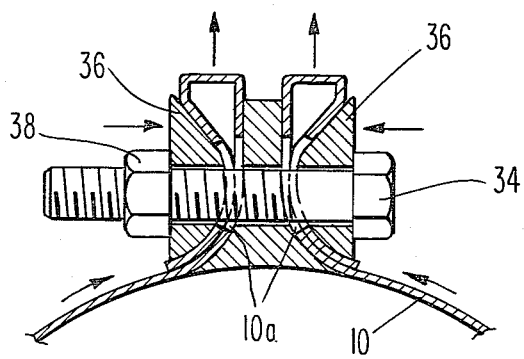

FIGS. 3a through 3c show a second preferred embodiment of the invention. These three figures are all cross-sections taken through one of the plurality of bolt holes formed in the band 10 and in the central spacing member 30 and show how the tightening of the bolt results in relative compression of the tube by the band. For example, in FIG. 3a the band 10 is shown generally assembled about a central member 30 having one or more holes 32 formed therein. The hole 32 is sized so as to fit relatively closely with a bolt 34 (FIG. 3b) inserted therethrough, while a somewhat wider slot 10a is formed in the band 10. As noted from FIG. 3a, the ends of the band 10 may be formed to comprise surfaces 10f and making an angle—typically between about 30° and about 60°, with respect to a plane on a diameter of the tube and going through the center of the spacing member 30—simply by folding over of its ends, and may thus double the thickness of the band in the region of the holes 10a. As noted, the hole 10a is a slot being larger than the hole 32 formed in the central member, so that relative movement of the band with respect to the bolts 34 is possible. Referring now to FIG. 3b, a bolt 34 is shown having been assembled through the slot 10a and through the hole 32 in the central spacing member 30. Matching force bars 36 are disposed on opposite sides of the central spacing member and are held in place by the bolt 34 on which is threaded a nut 38. As discussed above, the ends of the band 10 are formed to comprise angled reaction surfaces 10f disposed on either side and away from the central shaping member 30. These reaction surfaces 10f are adapted to interact with shaped surfaces on the force bars 36 and are disposed with respect to the slot 10a so that upon assembly of the force bars 36 together with bolt 34 and nut 38 the force bars 36 will only touch the ends of the band 10 at the reaction surfaces 10f, so that when the nut 38 is tightened on the bolt 34 thus exerting an axial stress on the bolt, the force exerted on the band 10 by the force bars 36 will be exerted only on the shaping surfaces 10f. Since these surfaces are on the side of the bolt 34 opposite the tube 30, the net effect of tightening the bolt 34 will be to pull the ends of the band 10 together and force them to slide outwardly past the force bars, thus tightening the band 10 on a tube or pair of tubes about which it is encircled. Clearly, the interacting surfaces of the band 10f and of the force bars 36, as in the case of the embodiment of FIGS. 1 and 2a–2c need not be simple planes or semicylinders, so long as they form a tangent surface throughout their relative movement. It will furthermore be understood that a plurality of bolts and nuts could be used by axial extensions of the force bars and spacing members, widening the band, and multiplying the holes and slots. Another possibility would be to fill the loop-like structure formed on the ends of the band with an incompressible member such as a rod, to preclude collapsing of the loop, though the passage of the bolt 34 through the slots formed in both the body of the band and in the folded over loop end would largely eliminate this possibility.

Further tightening of the nut 38 upon the bolt 34 results in the condition shown in FIG. 3c, where the force bars 36 have bottomed in the recesses formed in the end of the band 10 by its bending over to form its ends. It will be noted that in this embodiment the ends of the band are shaped to provide a reaction surface 10f to interact with the force bars, as opposed to the embodiment of FIGS. 2a–2c, in which the central shaping and spacing member provides the reaction surface. In the embodiment of FIGS. 3a–3c, the function of member 30 is chiefly therefore spacing the bolts 34 from the surface of the tube to be clamped, and providing shaped surfaces 30a and 30b (FIG. 3b) to exert force uniformly on the tube and to provide a wide radius bend to the band upon tightening of bolts 34 respectively. As noted, the shaft of the bolt 34 now abuts the bottom of the slot 10a formed in the ends of the band 10, as opposed to the position shown in FIG. 3b. Arrows drawn in FIG. 3c show the movement of the various parts of the clamp according to the invention, upon tightening of the nut 38 with respect to the bolt 34.

As discussed above in connection with FIGS. 2a through 2c, the amount of tightening provided by the clamp according to the invention is relatively limited, which requires that the clamp be chosen to fit relatively closely upon the tube prior to assembly. In turn this results in the advantage that the underside 30a of the central shaping member 30 can likewise be chosen to fit the tube relatively accurately, whereby substantially uniform compressional forces are exerted at all points around the circumference of the band on the tube.

It will be appreciated that there has been described a band seal clamp for the clamping of tubes to one another which meets the needs of the art and objects of the invention described above, although it might also be useful in clamping a single tube, e.g. to clamp a plug over a leak. The clamp of the invention is simple and readily and inexpensively manufacturable, yet exerts a substantially uniform compressional force upon tubes clamped thereby. Moreover, the fact that it relies upon relative movement of the band with respect to the clamping bolts, the positions of which are fixed by the central spacing member, as permitted by the formation of slots in the ends of the band, rather than upon simple deformation of the band to fit a recess formed in a central shaping member, as shown in the prior art, results in more of the total force being applied to clamping and less lost to deformation. Finally, it will be appreciated that while two preferred embodiments of the invention have been described, numerous other modifications and improvements are possible. In particular, the clamp of the invention need not be symmetric; only one end of the band need have an angled reaction surface, and only one forcebar need be provided. In some circumstances this might simplify manufacture and/or assembly of the clamp of the invention. Therefore, the scope of the invention should not be measured by the above disclosure, which is exemplary only, but rather by the following claims.

What is claimed is:

1. A band clamp for clamping of one or more tubular members, comprising:
   an elongated flat strip of material adapted to be circumferentially wrapped around said tubular members to be coupled and having outwardly extending end portions, said end portions having slots extending in the direction of elongation of said strip for interaction with clamping means inserted therethrough;
   a central shaping and spacing member adapted to be disposed between the end portions of said strip and having holes formed therein for insertion of said clamping means, said holes being so sized as to fit relatively closely with said clamping means, and shaped to fit said tubular members to be clamped; and
   first and second force transmitting members adapted to be disposed on opposite sides of said central shaping member and of said end portions of said band, said force transmitting members having holes formed therein for insertion of said clamping means and having outwardly extending reaction surfaces formed thereon to interact with inwardly extending reaction surfaces formed on the end portions of said band, whereby the slots permit the end portions of said band to move generally radially outwardly with respect to said tubular members when clamped by said clamping means.

2. The clamp of claim 1 wherein the material of which said strip is formed is metallic.

3. The clamp of claim 1 wherein said clamping means comprise a threaded bolt and a nut mating therewith.

4. The clamp of claim 1 wherein the reaction surfaces on the ends of said band are formed by bending the ends of said strip to form a generally loop-like end on said band, whereby reaction surfaces at an angle to the surface of said tubular members are formed.

5. The clamp of claim 1 wherein said reaction surfaces on the ends of said band are defined by shapes formed in said central shaping and spacing member.

6. A band seal clamp for clamping one or more tubular members, comprising:
   a spacing member having one or more holes formed therein for the insertion of generally cylindrical bolts and adapted to space the axes of said bolts a predetermined distance from said tubular members;
   at least one force bar having holes formed therein for the insertion of said bolts, and having a generally planar surface extending generally axially with respect to said tubular members and disposed at an angle between about 30° and about 60° with respect to a plane on a diameter of said tubular members passing through the center of said spacing member; and a generally strap-like band having first and second end portions having slots formed therein for insertion of said bolts, at least one of said end portions being shaped so as to coact with said surface formed on said force bar, so that upon assembly of said band its end portions are disposed on opposite sides of said spacing member, said force bar is disposed on the same side of said shaped end portion of said bands from said spacing member, said shaped end portion separating said force bar from said spacing member, and said bolts are inserted through said holes in said spacing member, through said force bar and through said slots in said band, such that upon tightening of said bolts, the slots permit the end portions of said band to move in a direction generally radially outwardly from said tubular member, whereby a substantially uniform compressive force is exerted at all points around the circumference of said tubular members covered by said band.

7. The clamp of claim 6 wherein said slots extend generally radially outwardly with respect to the axis of said tubular members.

8. The clamp of claim 6 wherein said band is formed of a metallic material.

9. The claim of claim 6 wherein said end of said band shaped to coact with said force bar is formed by bending over the end of said band to define a generally loop-like structure.

10. The clamp of claim 6 wherein the shape of said end of said band shaped to coact with said surface formed on said force bar is defined by a shape formed in said spacing member.

11. A band clamp for clamping of one or more tubular members, comprising:

an elongated flat strip of material adapted to be circumferentially wrapped around said tubular members to be coupled and having slots extending in the direction of elongation of said strip formed in the end portions thereof for interaction with clamping means inserted therethrough;

a central shaping and spacing member adapted to be disposed between the ends of said strip and having holes formed therein for insertion of said clamping means, said holes being so sized as to fit relatively closely with said clamping means, and shaped to fit said tubular members to be clamped; and first and second force transmitting members adapted to be disposed on opposite sides of said central shaping member and of said ends of said band, having holes formed therein for insertion of said clamping means and having reaction surfaces extending generally outwardly formed thereon to interact with reaction surfaces extending generally inwardly formed on the ends of said band, whereby said slots permit the ends of said strip to move generally radially outwardly with respect to said tubular members when clamped by said clamping means.

12. The clamp of claim 11 wherein the material of which said strip is formed is metallic.

13. The clamp of claim 11 wherein said clamping means comprise a threaded bolt and a nut mating therewith.

14. The clamp of claim 11 wherein the reaction surfaces on the ends of said band are formed by bending the ends of said strip to form a generaly loop-like end on said band, whereby reaction surfaces at an angle to the surface of said tubular members are formed.

15. The clamp of claim 11 wherein said reaction surfaces on the ends of said band are defined by shapes formed in said central shaping and spacing member.

* * * * *